(12) United States Patent
Chen

(10) Patent No.: US 7,294,939 B1
(45) Date of Patent: Nov. 13, 2007

(54) FOLDING PORTABLE WIND-POWER ELECTRICITY GENERATING APPARATUS

(76) Inventor: Shih H Chen, No. 1-57, Zhonghua Rd., Yongkang City, Tainan County 710 (TW)

(*) Notice: Subject to any disclaimer, the term of this patent is extended or adjusted under 35 U.S.C. 154(b) by 0 days.

(21) Appl. No.: 11/556,288

(22) Filed: Nov. 3, 2006

(51) Int. Cl.
*F03D 9/00* (2006.01)
(52) U.S. Cl. .......................................... 290/55
(58) Field of Classification Search ............... 290/55
See application file for complete search history.

(56) References Cited

U.S. PATENT DOCUMENTS

| | | | |
|---|---|---|---|
| 6,624,530 B1* | 9/2003 | Toulon | 290/55 |
| 6,776,115 B1* | 8/2004 | De Meo | 114/97 |
| 7,105,940 B2* | 9/2006 | Weesner et al. | 290/44 |
| 7,176,584 B1* | 2/2007 | Green | 290/55 |
| 2007/0194575 A1* | 8/2007 | Wu | 290/55 |

FOREIGN PATENT DOCUMENTS

| | | | |
|---|---|---|---|
| DE | 10330718 A1 * | 2/2004 | |
| GB | 2329534 A * | 3/1999 | |
| GB | 2427003 A * | 12/2006 | |
| JP | 2001254218 A * | 9/2001 | |
| RU | 2009372 C1 * | 3/1994 | |

* cited by examiner

Primary Examiner—Waks Joseph

(57) ABSTRACT

A wind-power electricity generating apparatus includes a base, a cover and an electricity generating set. The cover is pivotally coupled to a lateral side of the base and can be lifted open or covered onto the base. A wind collecting surface is formed inside the cover, and a penetrating hole penetrating the cover is disposed at the center of the wind collecting surface. The electricity generating set includes a vane wheel and an electricity generator at a side of the vane wheel, and the vane wheel and the electricity generator are foldably disposed in the penetrating hole of the cover. The kinetic energy produced by rotating the vane wheel is used for driving the electricity generator to generate electric energy. The present invention greatly reduces the storage volume and facilitates users to carry the apparatus. In addition, the apparatus of the invention does not occupy much space for its storage.

11 Claims, 6 Drawing Sheets

FOLDING PORTABLE WIND-POWER ELECTRICITY GENERATING APPARATUS

BACKGROUND OF THE INVENTION

1. Field of the Invention

The present invention relates to a wind-power electricity generating apparatus, and more particularly to a portable wind-power electricity generating apparatus that can be folded to reduce the overall volume significantly and facilitate users to carry the apparatus.

2. Description of Prior Art

Since oil resources are extracted and used extensively, its stock is running increasingly short, and its price is going up constantly, and a large quantity of exhaust gas such as carbon dioxide produced by the use of oil destroys the ozonosphere and causes a greenhouse effect. Based on these reasons, alternative energy sources including solar energy, hydroelectric power, wind-power electricity generation, and various different solutions are provided, and thus finding an alternative solution obviously becomes an important subject for researchers and developers in the related industry.

A traditional wind-power electricity generating apparatus as disclosed in R.O.C. Pat. No. M250048 includes a base, a frame erected from the base, a plurality of partitions disposed in the frame, and a plurality of wind collecting partitions disposed inside the frame. Each wind collecting partition has an air inlet provided for airflow to flow inside and an air outlet provided for airflow to flow outside, and each wind collecting partition further has a vane wheel driven and rotated by the airflow that enters into each wind collecting partition for converting wind power into mechanical energy. An electricity generator is connected to each vane wheel for converting the mechanical energy transmitted by the plurality of vane wheels into an electric energy output.

However, such traditional wind-power electricity generating apparatus still has the following problems in its actual application. Since the traditional apparatus is a large fixed wind-power electricity generating apparatus, not only incurring a high price, but also requiring a complicated circuit layout and a procedure for connecting and fixing each conducting wire, therefore its application is complicated and inconvenient. Furthermore, the traditional apparatus does not come with a movable and foldable structure, and thus the apparatus cannot be integrated with the leisure industry closely related to our life, which is one of the major factors adversely affecting its practicability and economic effect. Since the structure of the traditional apparatus does not substantially reduce the overall volume for storage, the traditional apparatus occupies a significant volume of the available space and greatly limits its scope of applicability. All of the aforementioned drawbacks demand immediate attentions and required further improvements.

SUMMARY OF THE INVENTION

In view of the foregoing shortcomings of the prior art, the inventor of the present invention based on years of experience in the related industry to conduct experiments and modifications, and finally designed a folding portable wind-power electricity generating apparatus in accordance with the present invention.

Therefore, the present invention is to provide a folding portable wind-power electricity generating apparatus that includes a base, a cover for covering the base, and an electricity generating set for receiving the cover, so that the structure of the apparatus can greatly reduce its storage volume and facilitate users to carry the apparatus. Since the apparatus of the invention does not occupy much using space, therefore the invention further enhances the convenience of using the apparatus.

The present invention provides a folding portable wind-power electricity generating apparatus, comprising: a base, a cover and an electricity generating set, wherein the cover is pivotally coupled to a lateral side of the base and can be lifted opened or covered onto the base, and a wind collecting surface is formed inside the cover, and a penetrating hole is disposed at the center of the wind collecting surface and penetrating the cover. The electricity generating set comprises a vane wheel and an electricity generator installed at a side of the vane wheel, and the vane wheel and the electricity generator are foldably disposed in the penetrating hole of the cover, and the kinetic energy produced by rotating the vane wheel is used for driving the electricity generator to generate electric energy.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. However, the drawings are provided for reference and illustration only and are not intended for limiting the scope of the invention.

Figure 1:
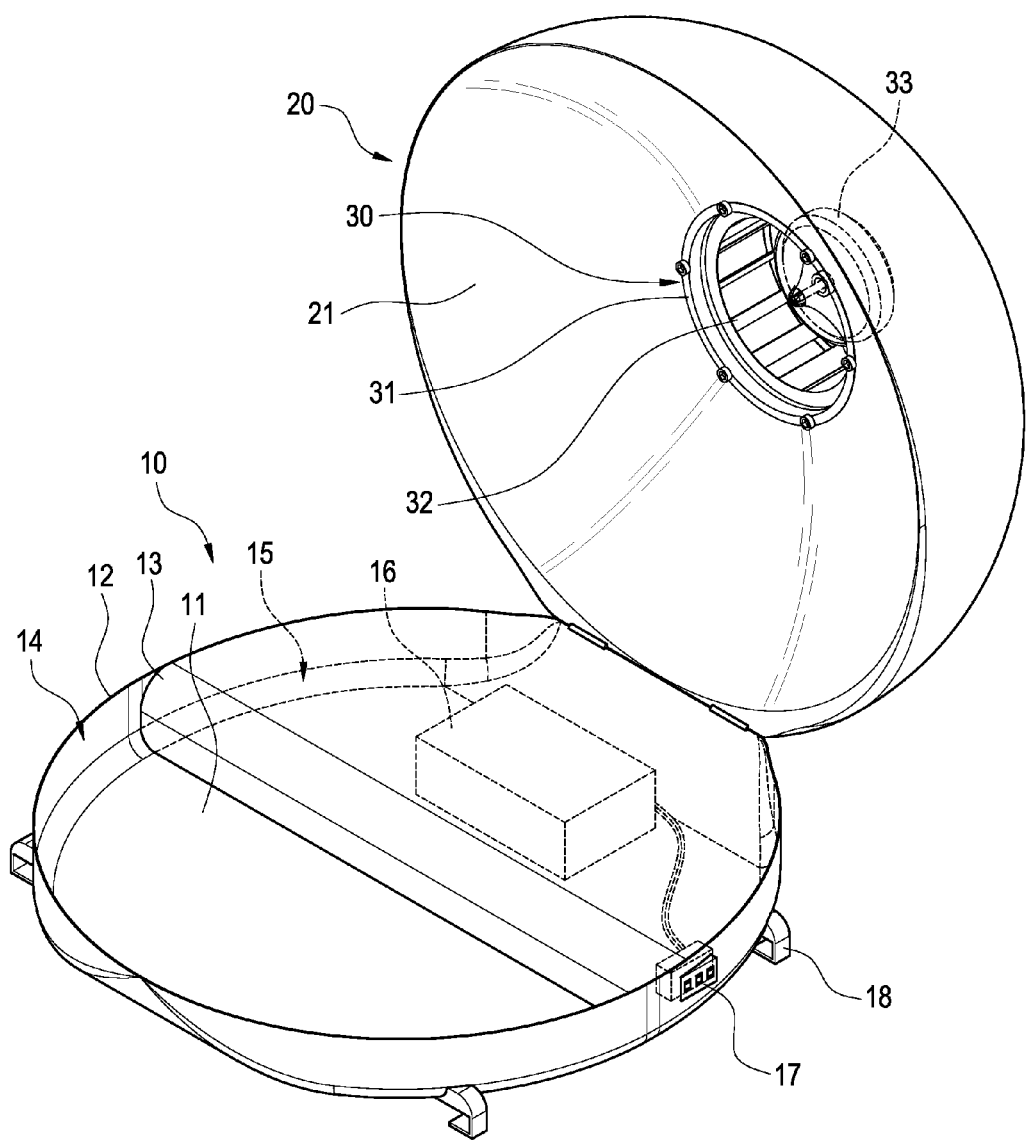
FIG. 1 is a schematic perspective view of lifting up a cover of the present invention.
Figure 2:
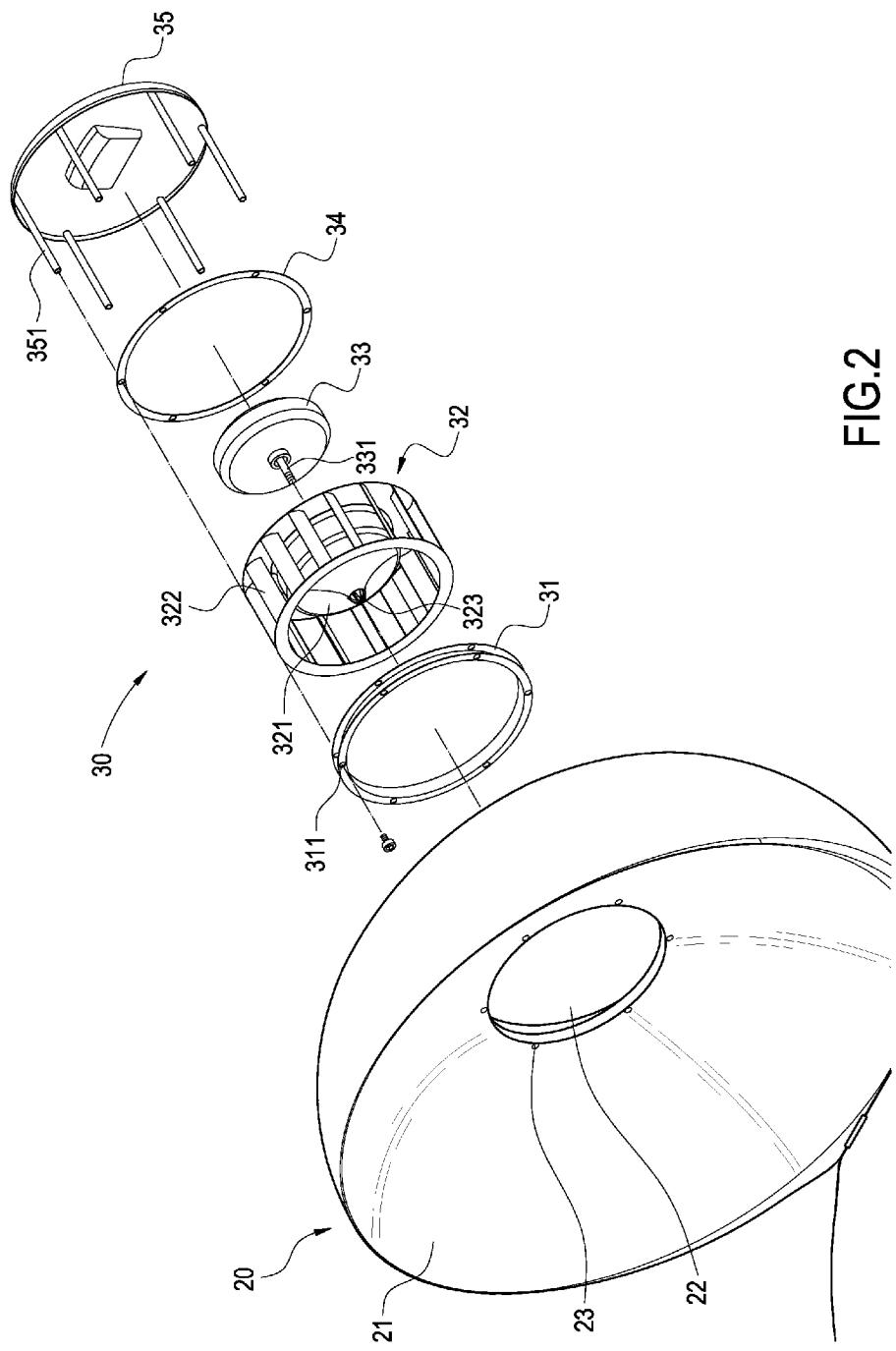
FIG. 2 is an exploded view of a cover and an electricity generating set of the present invention.
Figure 3:
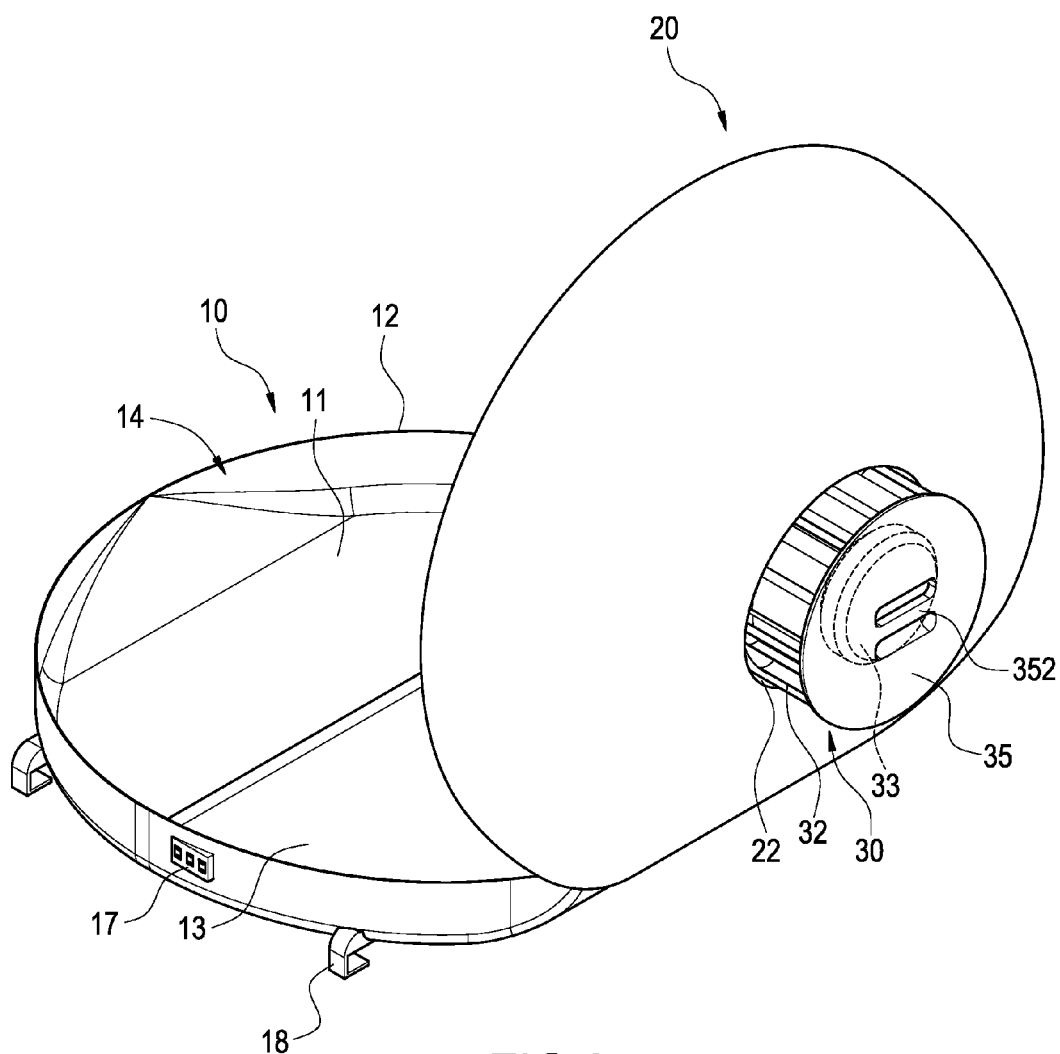
FIG. 3 is a schematic perspective view of pulling out an electricity generating set of the present invention.

Referring to FIGS. 1 to 3 respectively for a schematic perspective view of lifting up a cover of the present invention, an exploded view of a cover and an electricity generating set of the present invention and a schematic perspective view of pulling out an electricity generating set of the present invention, the present invention provides a folding portable wind-power electricity generating apparatus comprising a base 10, a cover 20 and an electricity generating set 30.

The base 10 is comprised of a bottom panel 11 and a surrounding panel 12 extended upward from the periphery of the bottom panel 11, and an L-shaped partition panel 13 is formed inside the base 10 to define a luggage storage area 14 and an electric power system storage area 15 for storing a power supply device such as a battery 16. Further, a power supply connector 17 has an end fixed to a side of the surrounding panel 12 and another end electrically connected to the battery 16, and each corner of the bottom panel 11 has a plurality of fixing clamps 18 for mounting the base 10.

The cover 20 is pivotally coupled to a side of the base 10, such that the cover 20 can be lifted or covered onto the base 10, and the cover 20 contains a concavely curved wind collecting surface 21, a penetrating hole 22 disposed at the center of the bottom of the wind collecting surface 21 and penetrating the cover 20, and a plurality of guiding holes 23 disposed at an area around the external periphery of the penetrating hole 22.

The electricity generating set 30 includes a vane wheel fixing ring 31, a vane wheel 32, an electricity generator 33, a waterproof washer 34 and a cap 35. The vane wheel fixing ring 31 is mounted onto the internal periphery of the penetrating hole 22, and a plurality of through holes 311 disposed on the vane wheel fixing ring 31 and corresponding to the guiding holes 23 of the cover 20. The vane wheel 32 and the electricity generator 33 are foldably coupled to the penetrating hole 22 of the cover 20, and the vane wheel 32 is a centrifugal vane wheel or axial flow vane wheel (not shown in the figure) having a wheel hub 321 and a plurality of vanes 322 disposed around the bottom panel of the wheel hub 321. The electricity generator 33 is contained in the wheel hub 321 of the vane wheel 32 and has a rotating axle 331 protruded outward from the center of the electricity generator 33, and the rotating axle 331 is passed through and out from the wheel hub 321 and fixed onto the vane wheel 32 by a screw nut 323, and the electricity generator 33 is electrically connected to a battery 16 by a conducting wire (not shown in the figure). The cap 35 includes a plurality of axial rods 351 corresponding to the guiding holes 23 and the through hole 311 and fixed onto the inner lateral side of the cap 35 and sequentially connected to the waterproof washer 34, the through hole 311 and the guiding holes. The cap 35 further has a pulling handle 352 formed at an outer lateral side of the cap 35 and provided for users to pull out or push in the vane wheel 32, electricity generator 33, waterproof washer 34 and cap 35.

In the process of assembling the wind-power electricity generating apparatus, the vane wheel fixing ring 31 is mounted onto the internal wall of the penetrating hole 22 of the cover 20, and the electricity generator 33 is installed at the center of the bottom of the cap 35, so that the rotating axle 331 of the electricity generator 33 can be passed through and out from the wheel hub 321 of the vane wheel and then fixed onto the rotating axle 331 by a screw nut 323, and thus the vane wheel 32 and the rotating axle 331 can be rotated altogether; and finally each axial rod 351 of the cap 35 is passed through the waterproof washer 34, the through hole 311 and the guiding holes 23 sequentially, and the distal surface of the axial rod 351 is fixed by a fixing element such as a screw, so as to complete the process of assembling the wind-power electricity generating apparatus in accordance with the present invention.

Figure 4:
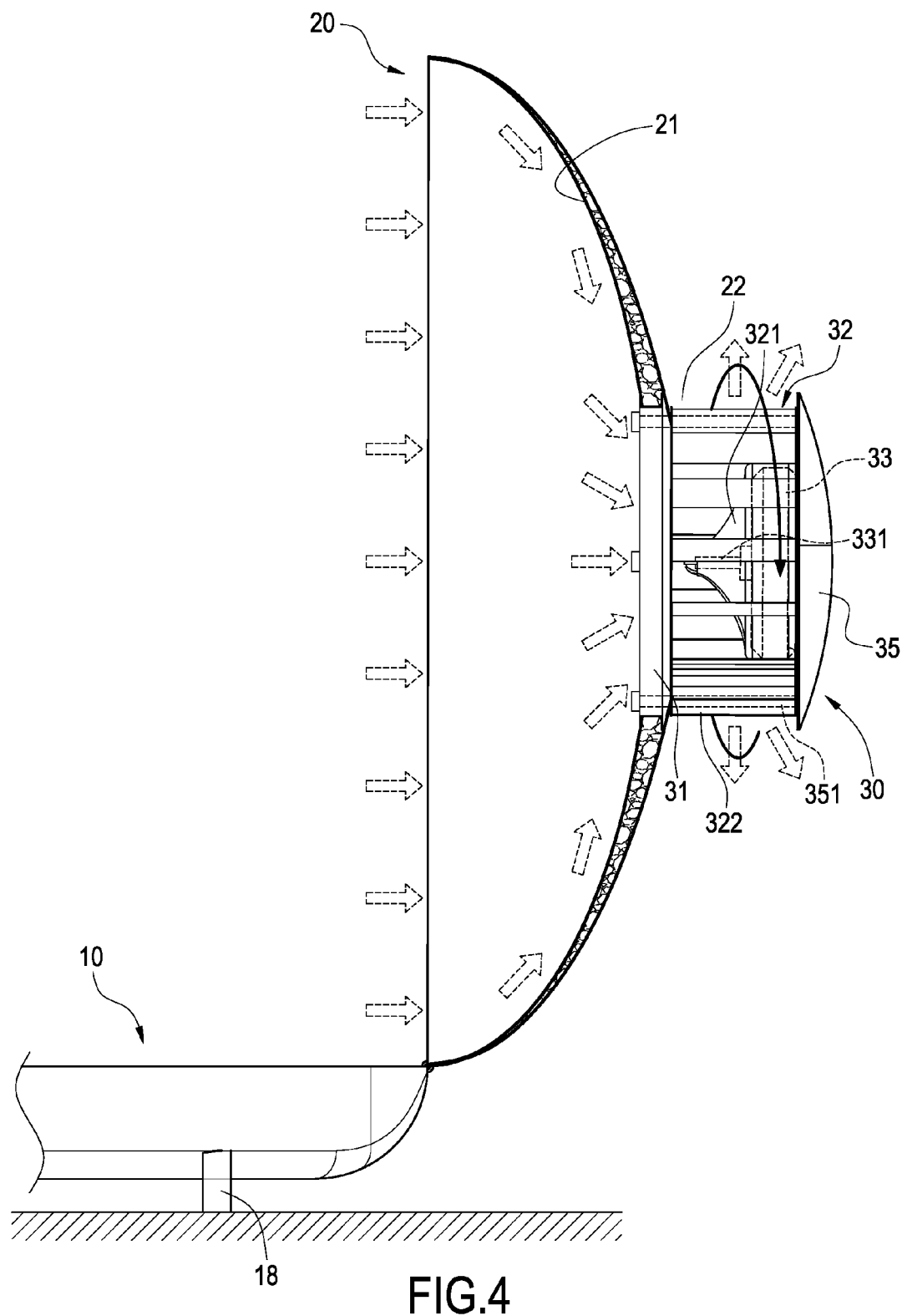
FIG. 4 is a partial cross-sectional view of an application of the present invention.

Referring to FIG. 4 for a partial cross-sectional view of an application of the present invention, the cover 20 is lifted up from the base 10, and the pulling handle 352 of the cap 35 is held by a user's hand to pull out the vane wheel 32 and the electricity generator 33. If wind is blowing in a direction towards the cover 20, the wind will move along the concavely curved surface of the wind collecting surface 21 and enter from into the penetrating hole 22 of the cover 20 and flow out from the intervals between the vanes 322, so that the vane wheel 32 can drive the rotating axle 331 of the electricity generator 33 to rotate and generate kinetic energy.

The electricity generator 33 converts the kinetic energy into electric energy and stores the electric energy into the battery 16, so as to achieve the operations of the wind-power electricity generating apparatus in accordance with the present invention.

Figure 5:
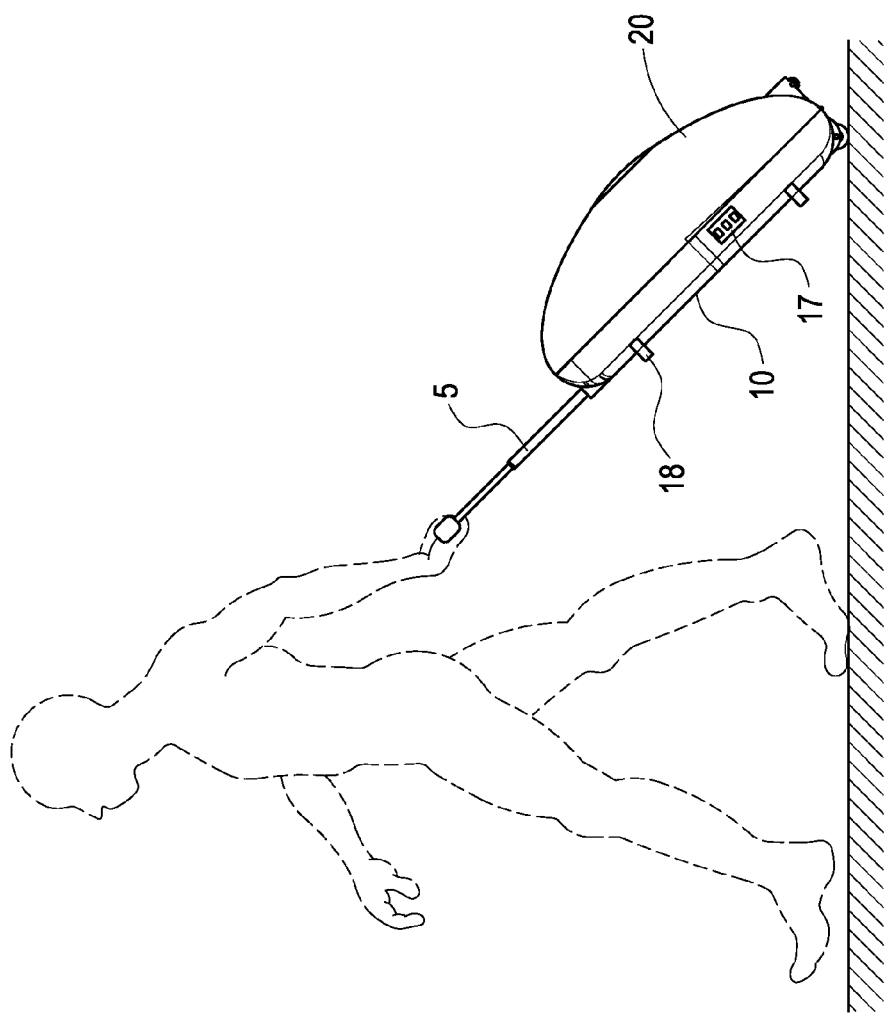
FIG. 5 is a schematic view of manually pulling a pull rod mechanism for the application of the present invention.
Figure 6:
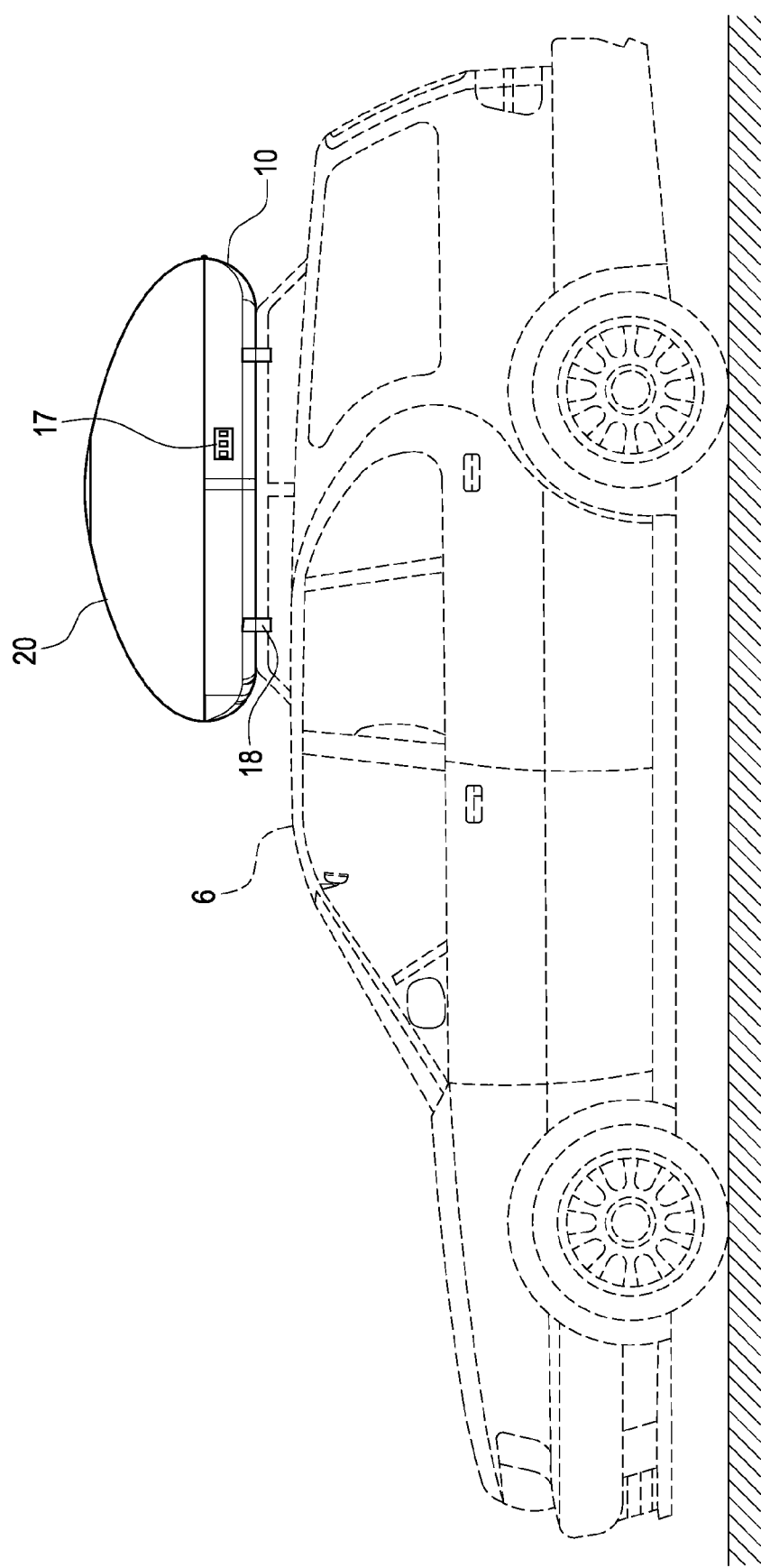
FIG. 6 is a schematic view of integrating a wind-power electricity generating apparatus with a transportation means in accordance with the present invention.

Referring to FIGS. 5 and 6 respectively for a schematic view of manually pulling a pull rod mechanism for the application of the present invention and a schematic view of integrating a wind-power electricity generating apparatus with a transportation means in accordance with the present invention, the wind-power electricity generating apparatus can be integrated to a pull rod mechanism 5, and the pull rod mechanism 5 can be passed and connected to the bottom of the base 10, and the fixing clamp 18 can be fixed to facilitate users to manually pull and carry the luggage as shown in FIG. 5, or the pulling rod mechanism 5 can be mounted onto the roof of a transportation means 6 such as a car as shown in FIG. 6, and the car roof has left and right support rods for latching each fixing clamp 18 of the base 10, such that after the cover 20 is covered onto the base 10 and the electricity generating set is stored in the cover, the storage volume can be reduced significantly to facilitate users to carry. Furthermore, the storage does not occupy much or any space inside a car during a trip, and the luggage storage area 14 in the base 10 can provide a space for storing objects and luggage, so as to enhance the convenience and popularity of the application.

In summation of the description above, the folding portable wind-power electricity generating apparatus of the invention complies with the patent application requirements and is duly filed for patent application.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A folding portable wind-power electricity generating apparatus, comprising:
    a base;
    a cover, pivotally coupled to a side of the base and can be lifted open or covered on the base, and having a wind collecting surface disposed inside the cover and a penetrating hole disposed on the wind collecting surface and penetrating the cover; and
    an electricity generating set, including a vane wheel and an electricity generator coupled to a side of the vane wheel, and the vane wheel and the electricity generator can be foldably installed in the penetrating hole of the cover, such that the kinetic energy produced by rotating the vane wheel is provided for driving the electricity generator to generate electric energy.

2. The folding portable wind-power electricity generating apparatus of claim 1, wherein the base is comprised of a bottom panel and a surrounding panel extended upward from the periphery of the bottom panel.

3. The folding portable wind-power electricity generating apparatus of claim 2, wherein the base comprises a partition panel therein for separating a luggage storage area and an electric power system storage area, and the electric power system storage area contains a battery electrically connected to the electricity generator.

4. The folding portable wind-power electricity generating apparatus of claim 3, wherein the base includes a power supply connector with an end fixed on a side of the surrounding panel and another end electrically connected to the battery.

5. The folding portable wind-power electricity generating apparatus of claim 2, wherein the base includes a plurality of fixing clamps disposed outside the bottom panel for fixing the base.

6. The folding portable wind-power electricity generating apparatus of claim 1, wherein the wind collecting surface of the cover is concavely curved.

7. The folding portable wind-power electricity generating apparatus of claim 1, wherein the vane wheel is a centrifugal vane wheel or an axial flow vane wheel.

8. The folding portable wind-power electricity generating apparatus of claim 1, wherein the electricity generating set further comprises: a cap with an internal side for installing and connecting the vane wheel and the electricity generator; a plurality of axial rods disposed at the external periphery of the cap, and a plurality of guiding holes disposed at the external periphery of the penetrating hole of the cover for passing the corresponding axial rods.

9. The folding portable wind-power electricity generating apparatus of claim 8, wherein the cap has a pulling handle disposed on an external side of the cap and provided for pulling out or pushing in the electricity generating set.

10. The folding portable wind-power electricity generating apparatus of claim 8, wherein the electricity generating set further includes a vane wheel fixing ring mounted onto the internal periphery of the penetrating hole, and a plurality of through holes disposed on the vane wheel fixing ring and corresponding to the guiding holes for passing the axial rods.

11. The folding portable wind-power electricity generating apparatus of claim 10, wherein the electricity generating set further includes a waterproof washer installed between the vane wheel fixing ring and the cap.

* * * * *